Patented May 13, 1952

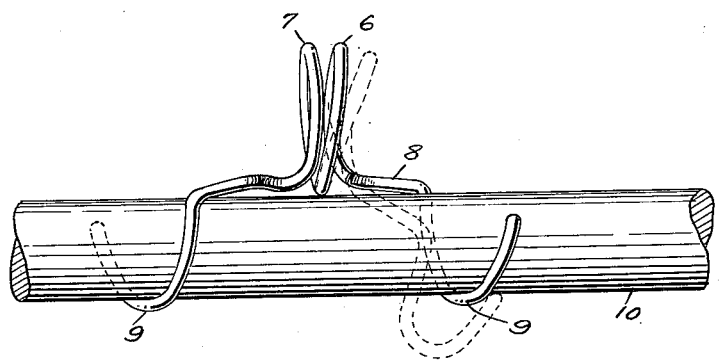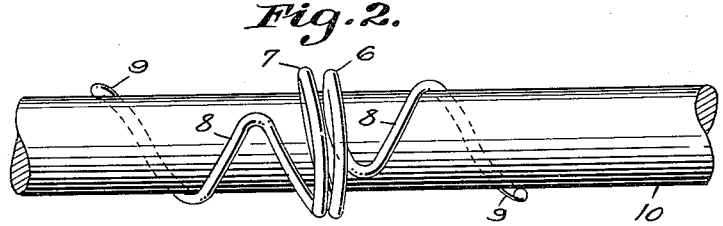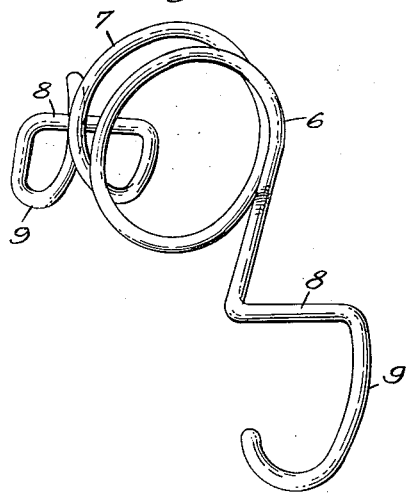

2,596,835

UNITED STATES PATENT OFFICE 2,596,835

SNAP-ON LINE GUIDE FOR FISHING POLES

Cleave Raymond Benge, Benkelman, Nebr.

Application August 18, 1949, Serial No. 110,913

1 Claim. (Cl. 43—24)

This invention relates to line guides designed for use on fishing poles, the primary object of the invention being to provide a line guide which may be readily and easily snapped on a pole to replace a broken line guide, or to provide a line guide for a pole which has been purchased and is not supplied with line guides as in the more expensive fishing poles and rods.

An important object of the invention is to provide a line guide of this character which when positioned, will securely grip the rod or pole for which it is constructed, holding the line guide rigidly on the pole against movement while the line is being reeled through the guide.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is an elevational view of a line guide constructed in accordance with the invention, showing the same as applied to a fishing rod or pole.

Fig. 2 is a plan view thereof.

Fig. 3 is a perspective view taken from one end of the line guide.

Referring to the drawing in detail, the line guide is constructed of a length of yieldable wire material bent intermediate its ends to provide coils 6 and 7. The ends of these coils or loops extend laterally as at 8 where they are formed into curved hook portions 9 designed to hook around the pole or rod which in the present showing is indicated by the reference character 10.

As shown these hook portions are offset and disposed at an oblique angle with respect to the upper and lower surfaces of the rod, the hook members at opposite ends of the guide being disposed in opposite directions, so that in order to remove the line guide, it is necessary to force the free ends of the hooks downwardly, and then twist the line guide in a horizontal plane, whereupon the ends of the line guide or hooks will snap out of contact with the pole and be readily removable.

It might be further stated that under normal conditions, the laterally extended portions 8 of the line guides, are so arranged that they will have a tendency to draw the hook portions upwardly, so that when positioning the hook portions, the hook portions must be bent downwardly slightly bending the laterally extended portions in order to position the guides. When the hook portions are released, it is obvious that this construction of the laterally extended portions of the hooks, will draw the hooks into close engagement with the rod or pole on which they are snapped into position, securely holding the line guide against movement either around the pole or rod or longitudinally of the pole or rod on which the guide is positioned.

Having thus described the invention, what is claimed is:

A yieldable snap-on-line guide for fishing poles comprising a length of resilient wire material bent intermediate its ends providing continuous coils, the side faces of the coils being disposed substantially vertically, a portion of one of the coils extending below an adjacent coil for contact with the pole on which the guide is positioned, the end portions of the wire material of which the coils are formed, being extended inwardly and downwardly and then outwardly from the coils at oblique angles across the upper surfaces of the pole, said laterally extended portions engaging the pole at the outer ends of said portions only, and hooks formed at the extremities of the laterally extended portions adapted to hook under the pole securing the line guide in position.

C. RAYMOND BENGE.

REFERENCES CITED

The following references are of record in the file of this patent:

UNITED STATES PATENTS

| Number | Name | Date |
|---|---|---|
| 396,707 | Parker | Jan. 22, 1889 |
| 754,094 | Roth | Mar. 8, 1904 |
| 950,148 | Dissel | Feb. 22, 1910 |
| 1,875,697 | Blackburn | Sept. 6, 1932 |
| 2,319,464 | Kruse | May 18, 1943 |
| 2,398,862 | Sarkisian | Apr. 23, 1946 |
| 2,561,675 | Ross | July 24, 1951 |